US011274843B2

(12) United States Patent
Nayak et al.

(10) Patent No.: US 11,274,843 B2
(45) Date of Patent: Mar. 15, 2022

(54) SYSTEMS AND METHODS FOR PROVIDING MULTI-DIMENSIONAL LOAD DATA ON A DASHBOARD

(71) Applicant: Johnson Controls Tyco IP Holdings LLP, Milwaukee, WI (US)

(72) Inventors: Rajesh Nayak, Karnatak (IN); Abhigyan Chatterjee, Asansol (IN); Barkha Shah, MumbaiMH (IN); Shailesh Tavate, Maharashtra (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 70 days.

(21) Appl. No.: 16/237,622

(22) Filed: Dec. 31, 2018

(65) Prior Publication Data

US 2020/0208857 A1     Jul. 2, 2020

(51) Int. Cl.
*F24F 11/30*  (2018.01)
*F24F 11/50*  (2018.01)
*F24F 11/88*  (2018.01)
*F24F 11/63*  (2018.01)

(52) U.S. Cl.
CPC .............. *F24F 11/30* (2018.01); *F24F 11/50* (2018.01); *F24F 11/63* (2018.01); *F24F 11/88* (2018.01)

(58) Field of Classification Search
CPC .. F24F 11/30; F24F 11/50; F24F 11/88; F24F 11/63; G05B 23/0216; G05B 2219/2642; G05B 2219/2614; G05B 23/0275
See application file for complete search history.

(56) References Cited

U.S. PATENT DOCUMENTS

| | | | |
|---|---|---|---|
| 8,957,588 B1* | 2/2015 | Ericksen | H05B 47/11 315/153 |
| 9,274,684 B2* | 3/2016 | Han | G05B 23/0267 |
| 2008/0276127 A1* | 11/2008 | McFarland | G05B 19/0428 714/37 |
| 2010/0073159 A1* | 3/2010 | Schmickley | G05B 19/042 340/517 |
| 2010/0251150 A1* | 9/2010 | Walter | G06F 9/451 715/765 |
| 2010/0251184 A1* | 9/2010 | Majewski | G06F 3/0482 715/841 |
| 2011/0231320 A1* | 9/2011 | Irving | G06Q 30/00 705/80 |
| 2012/0072140 A1* | 3/2012 | Cowan | G06Q 50/06 702/60 |
| 2013/0085588 A1* | 4/2013 | Brun | G06F 8/24 700/97 |
| 2013/0085719 A1* | 4/2013 | Brun | G05B 15/02 703/1 |

(Continued)

*Primary Examiner* — Thomas C Lee
*Assistant Examiner* — Charles Cai
(74) *Attorney, Agent, or Firm* — Foley & Lardner LLP

(57) ABSTRACT

One implementation of the present disclosure is a method of providing multi-dimensional load data to a user. The method includes generating, by a processing circuit, a user interface that enables a user to configure one or more components in one or more dimensions; receiving, by the processing circuit, a user input requesting load data in a first dimension; generating, by the processing circuit, first dimensional load data for each component in the first dimension; and presenting, by the processing circuit, the first dimensional load data to the user.

18 Claims, 12 Drawing Sheets

(56) References Cited

U.S. PATENT DOCUMENTS

| | | | | |
|---|---|---|---|---|
| 2013/0086066 A1* | 4/2013 | Anderson, Jr. | ......... | H04L 41/12 |
| | | | | 707/737 |
| 2015/0256355 A1* | 9/2015 | Pera | .................. | H04L 12/2823 |
| | | | | 700/90 |
| 2016/0370447 A1* | 12/2016 | Kim | ....................... | G01R 22/10 |
| 2018/0136953 A1* | 5/2018 | Walter | ................... | G06F 9/451 |
| 2019/0243314 A1* | 8/2019 | Lyman | ................... | G05B 13/02 |
| 2020/0195464 A1* | 6/2020 | Fargier | ..................... | E06B 9/00 |

* cited by examiner

SYSTEMS AND METHODS FOR PROVIDING MULTI-DIMENSIONAL LOAD DATA ON A DASHBOARD

BACKGROUND

The present disclosure relates generally to a building management system (BMS) and more particularly to a BMS that calculates and represents multi-dimensional load data. A BMS is, in general, a system of devices configured to control, monitor, and manage equipment in or around a building or building area. A BMS can include, for example, a heating, ventilation, and air conditioning (HVAC) system, a security system, a lighting system, a fire alerting system, any other system that is capable of managing building functions or devices, or any combination thereof.

With the advent of advanced building management systems today, it is becoming increasingly viable to monitor a multitude of components within a building to control energy usage of the building. Particularly, an energy management system is type of building management system that focuses on the energy distribution of a building. The energy management system can be a collection of computer-based tools designed to monitor and control energy usage. For a user to monitor and control the system, a user interface is configured to present data on the different elements of system.

SUMMARY

One implementation of the present disclosure is a method of providing multi-dimensional load data to a user. The method includes generating, by a processing circuit, a user interface that enables a user to configure one or more components in one or more dimensions; receiving, by the processing circuit, a user input requesting load data in a first dimension; generating, by the processing circuit, first dimensional load data for each component in the first dimension; and presenting, by the processing circuit, the first dimensional load data to the user.

The method further includes receiving, user input requesting load data in the first dimension by a second dimension; generating, by the processing circuit, second dimensional load data based upon receiving user request, wherein the second dimensional load data is generated by breaking up the first dimensional load data according to the second dimension.

The method further includes comprising receiving, user input requesting load data in the second dimension by a third dimension, and generating, by the processing circuit, third dimensional load data based upon receiving user request, wherein the third dimensional load data is generated by breaking up the second dimensional load data according to the third dimension.

The first dimension is associated with a component nature, the component nature comprising electricity, natural gas, gas, steam, diesel. The second dimension is associated with a load type, the load type comprising HVAC, lighting, plug load, and IT. The third dimension is associated with a component category, the component category comprising tenant load, vacant load, and common load.

Another implementation of the present disclosure is a building management system for generating and presenting multi-dimensional load data. The building management system is configured to: generate a user interface that enables a user to configure one or more components in one or more dimensions; receive a user input requesting load data in a first dimension; generate first dimensional load data for each component in the first dimension; and present the first dimensional load data to the user.

The building management system is further configured to receive user input requesting load data in the first dimension by a second dimension, and generate second dimensional load data based upon receiving user request, wherein the second dimensional load data is generated by breaking up the first dimensional load data according to the second dimension.

The building management system is further configured to receive user input requesting load data in the second dimension by a third dimension, and generate third dimensional load data based upon receiving user request, wherein the third dimensional load data is generated by breaking up the second dimensional load data according to the third dimension.

The first dimension is associated with a component nature, the component nature comprising electricity, natural gas, gas, steam, diesel. The second dimension is associated with a load type, the load type comprising HVAC, lighting, plug load, and IT. The third dimension is associated with a component category, the component category comprising tenant load, vacant load, and common load.

Another implementation of the present disclosure is a building management system for managing a graphical user interface and operating one or more pieces of building equipment. the system includes one or more pieces of building equipment configured to control an environmental condition of a building and a processing circuit. The processing circuit is configured to: generate a user interface that enables a user to configure one or more components in one or more dimensions; receive a user input requesting load data in a first dimension; generate first dimensional load data for each component in the first dimension; and present the first dimensional load data to the user.

The processing circuit is further configured to receive user input requesting load data in the first dimension by a second dimension, and generate second dimensional load data based upon receiving user request, wherein the second dimensional load data is generated by breaking up the first dimensional load data according to the second dimension.

The first dimension is associated with a component nature, the component nature comprising electricity, natural gas, gas, steam, diesel. The second dimension is associated with a load type, the load type comprising HVAC, lighting, plug load, and IT.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a building management system is shown, according to various exemplary embodiments. The building management system can be particularly an energy management system that a user can interact with through a user interface. Some embodiments of the present disclosure provide methods and systems for calculating and representing multi-dimensional load data on a dashboard provided through the user interface. For an energy management system, the more the granular the data is the better is the outcome to the user for analyzing the data. The granular multi-dimensional load data provides the user data till load level. The load level indicates which service is provided to the end user through the meters, such as HVAC, lighting, plug load, etc. The load level data provides the user information of a specific load that is driving excess consumption. The multi-dimensional load data also include a dimension that is defined by dividing each load type into tenant load, vacant load, and common load. This load type dimension provides the user (e.g., a building owner) an in-depth understanding of what load is providing service to either a tenant or is in the common area (e.g., area that is not dedicatedly allocated to tenant) or a vacant area (e.g., area that is not occupied by a tenant). In case of any leakage of energy, the multi-dimensional data provides an easier way for the user to get to the root cause of the energy leakage with the inbuilt recommendation engine.

Building Management System and HVAC System

Figure 1:
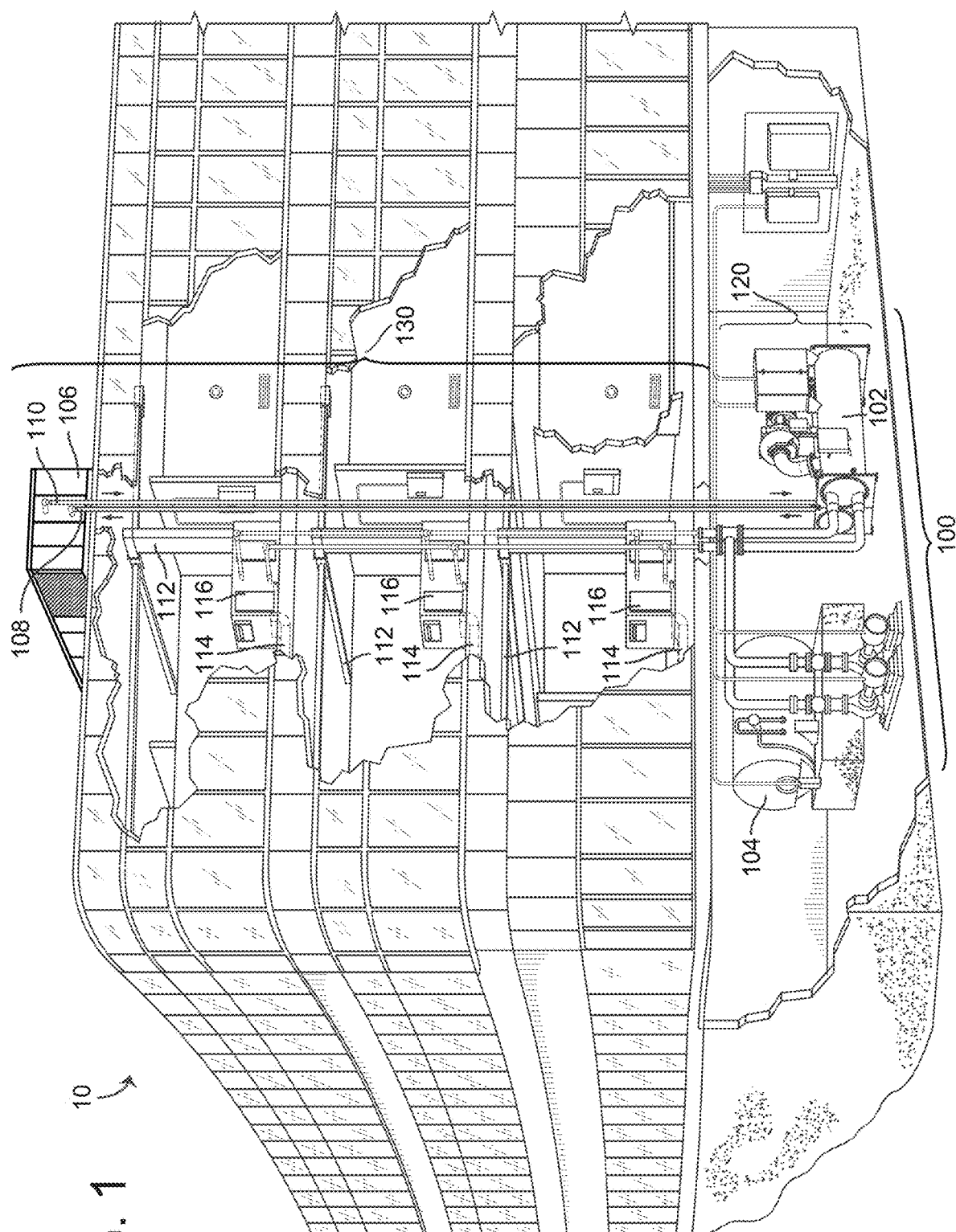
FIG. 1 is a schematic drawing of a building equipped with a HVAC system, according to an exemplary embodiment.

Referring now to FIGS. 1-4, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
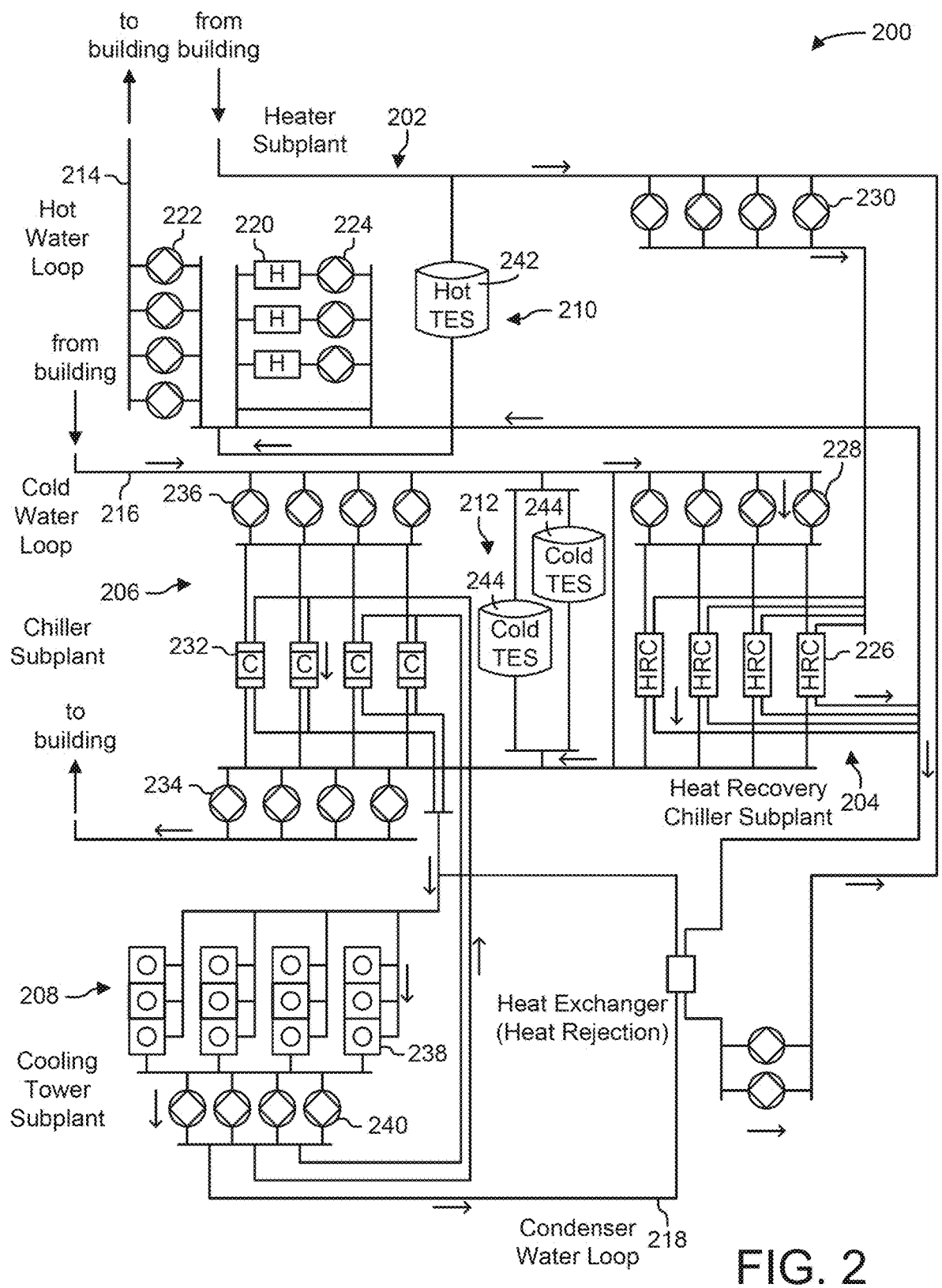
FIG. 2 is a schematic block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
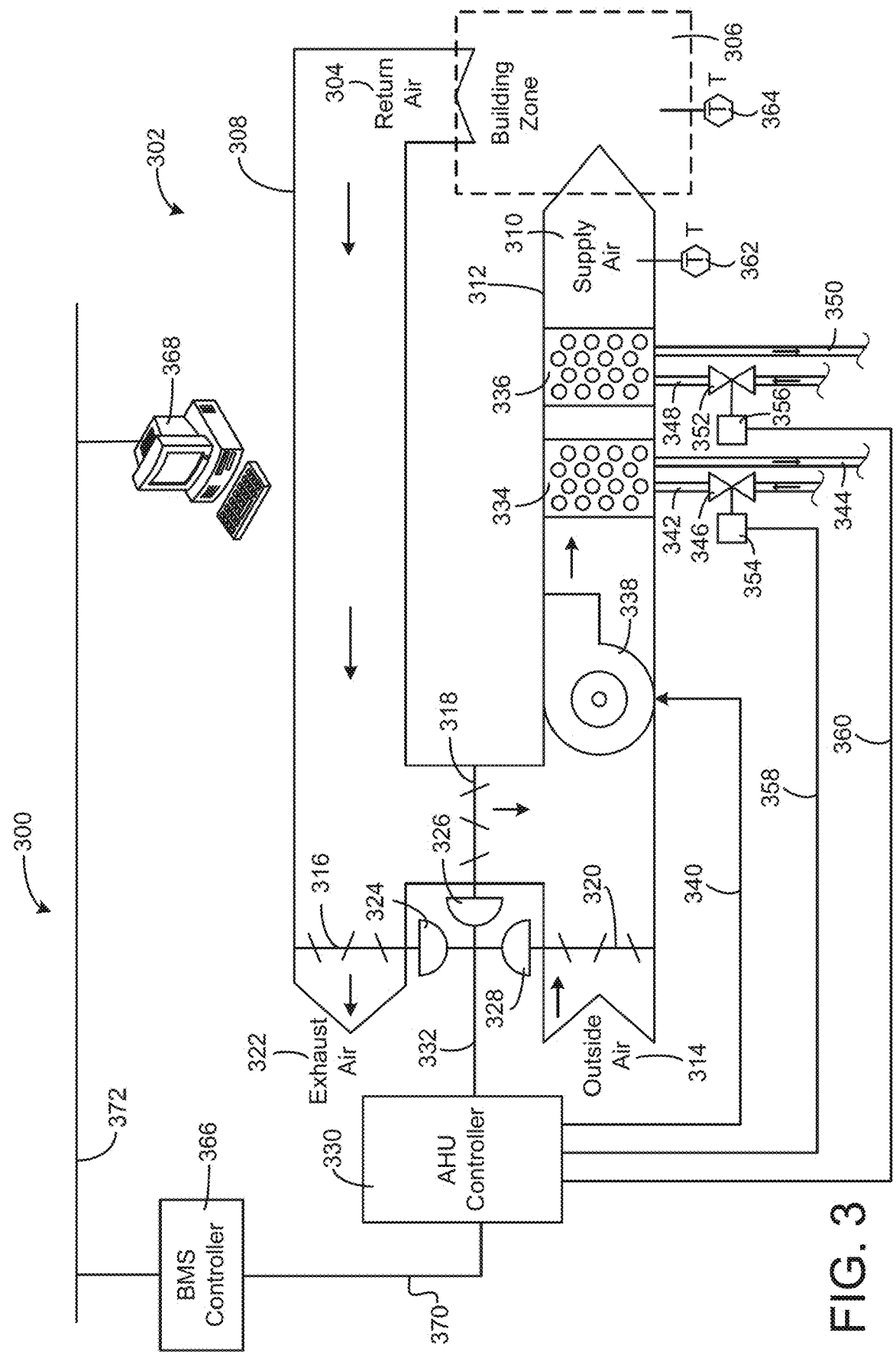
FIG. 3 is a schematic block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
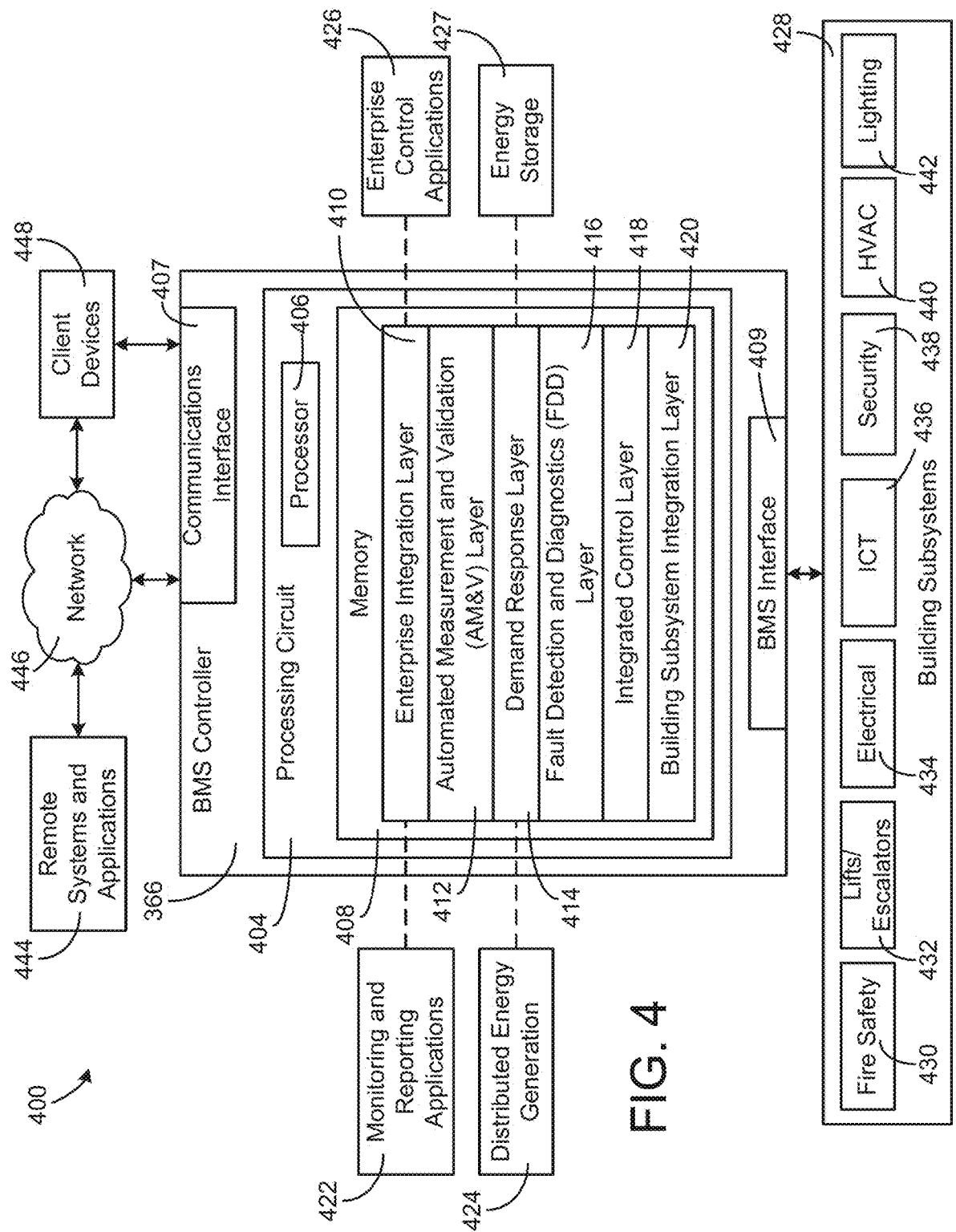
FIG. 4 is a schematic block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Energy Management System

Figure 5:
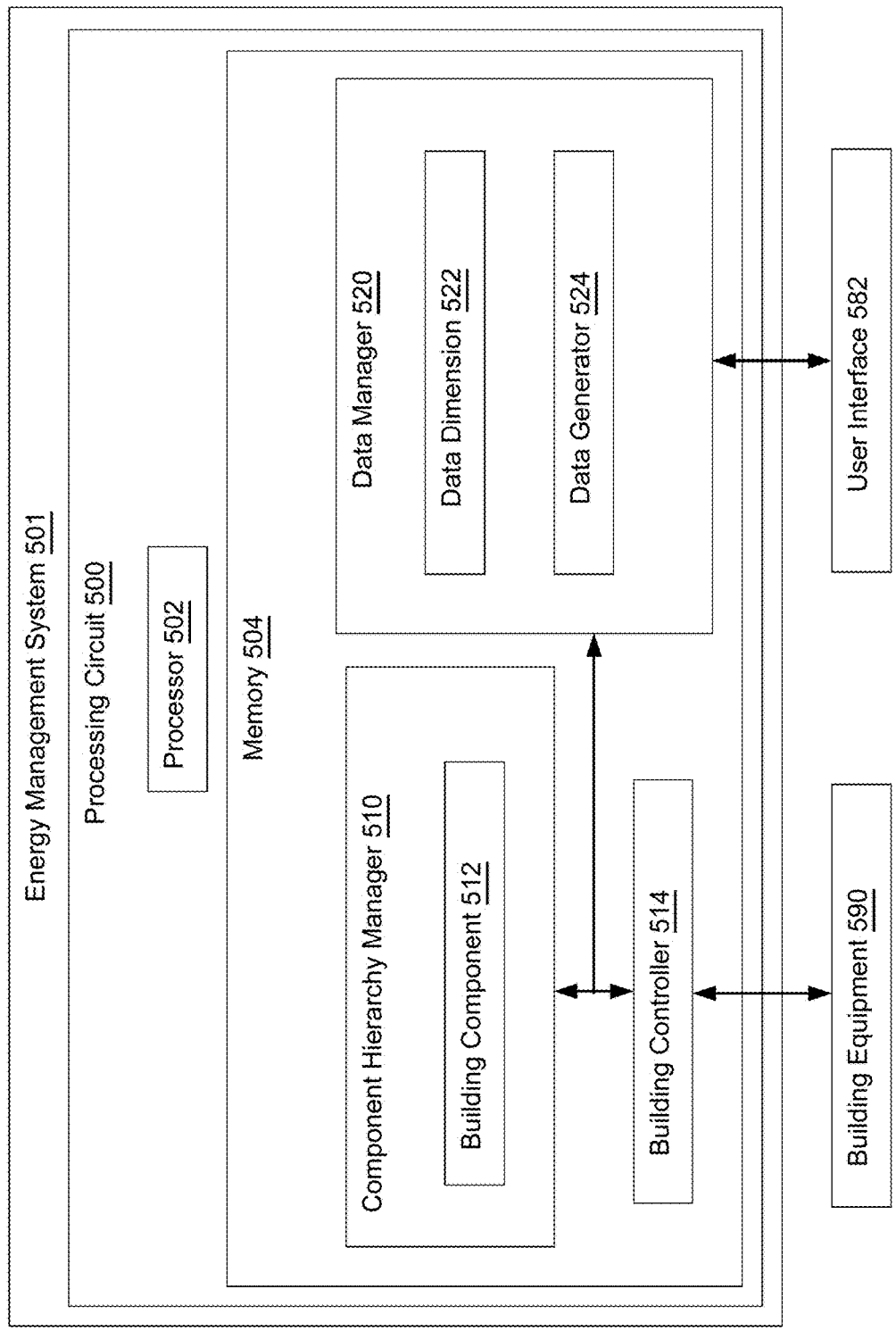
FIG. 5 is a schematic block diagram of an energy management system that can be implemented in the BMS controller of FIG. 4, according to an exemplary embodiment.

Referring now to FIG. 5, an energy management system 501 is shown for generating and presenting multi-dimensional data to user and managing energy resources of a building (e.g., the building 10 as described with reference to FIG. 1), according to an exemplary embodiment. The energy management system 501 may be implemented in the BMS controller 366, the remote systems and applications 444, and/or the client devices 448 of FIG. 4. The energy management system 501 can be configured to generate a graphical user interface, as described in greater detail with further reference to FIGS. 6-10, that can present multi-dimensional load data to the user for controlling various pieces of building equipment and/or building systems to manage energy for a building (e.g., thermostats, controllers, chillers, boilers, energy storage supplants, and/or any of the devices and/or systems as described with reference to FIGS. 1-4). The energy management system 501 can be configured to present generate and present multi-dimensional load data in a granular level to the user for the user to analyze load consumption in a building. Energy management system 406 is configured to be a subsystem of BMS 400 in some embodiments. For example, energy management system 501 may be a subsystem of BMS 400 configured to analyze data input from a user and generate information including the multi-dimensional load data about energy management system 501 for the user.

The energy management system 501 is shown to include a processing circuit 500. The processing circuit 500 includes a processor 502 and a memory 504. The processor 502 can be a general purpose processor, an application specific integrated circuit (ASIC), one or more field programmable gate arrays (FPGAs), a group of processing components, or other suitable electronic processing components. Processing circuit 500 can include a memory 504.

The memory 504 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 504 can be or include volatile memory or non-volatile memory. The memory 504 can include database components, object code components, script components, or any other type of information structure for supporting the various activities and information structures described in the present application. According to an example embodiment, the memory 504 is communicably connected to processor 502 via processing circuit 500 and includes computer code for executing one or more processes described herein.

The memory 504 can include a component hierarchy manager 510, a building controller 514, and a data manager 520. The component hierarchy manager 510, the building controller 514, and the data manager 520 can be configured to operate together to display information on user interface 582 for energy management. The data manager 520 can generate a dashboard presenting multi-dimensional load data to the user. The component hierarchy manager 510, the building controller 514, and/or the data manager 520 can be configured to operate together by communicating data, instructions, user inputs, and/or user outputs among each. The data manager 520 can be configured to receive a hierarchy of building components from the component hierarchy manager 510 and load data in each building component and load data in each hierarchy. The information about different components of the energy management system 501 is obtained through the building controller 514, which is communicably connected to the data manager 520.

The component hierarchy manager 510 includes building components 512. According to some embodiments, the building components 512 may be a hierarchical set of elements representing different systems, subsystems, sensors, controllers, and other various components of a building and/or controlled by a building management system (e.g., temperature sensors, humidity sensors, pressure sensors, CO2 probes, HVAC subsystems, security subsystems, etc.). Building components 512 and their location in the hierarchical set may be programmed into the system beforehand.

Building controller 514 is communicably connected to the building equipment 590, in some embodiments. Building controller 514 can be configured to receive input data from sensors, electrical devices, and/or servers that may be included in energy management system 501. The building controller 514 may be communicably connected to building equipment 590 to receive input data from building 10. Using this data, the building controller 514 may configure a hierarchy of building components 512 and generate multi-dimensional load data for each building components 512. Building controller 514 can perform some and/or all of the control algorithms described with reference to FIG. 4 (e.g., optimization algorithms, PID algorithms, etc.).

The data manager 520 is configured to receive user request for load data in any granular level according to some embodiments. For example, the data manager 520 receives user input of specific components and generates load data for the specific components. The data manager 520 is configured to generate multi-dimensional load data. The data manager 520 is configured to present user requested data in any granular level.

The data manager 520 is configured to define multiple data dimensions 522. For example, the data manager 520 is configured to define a meter nature dimension that indicates a nature of the meter. The meter nature includes electricity, natural gas, steam, diesel, gas, etc. The multiple data dimensions 522 include a meter category dimension that indicates what category a meter belongs to. The meter category includes tenant load, vacant load, common load, etc. The multiple data dimensions 522 include a meter load type dimension that indicates types of load, such as HVAC load, lighting load, plug load, IT load, etc. The data manager 520 is configured to receive user input regarding which dimension the user selects for load data.

The data generator 524 is configured to generate load data in a user selected dimension. In some embodiments, the data generator 524 generates load data in multiple dimensions. The data generator 524 is configured to provide the multi-dimensional data to the user interface 582.

The user interface 582 may display load data at a requested dimension to the user. The user is able to request load data in any granular level in order to analyze the load consumption within the building. The user interface 582 allows the user to input information of one or more dimensions. In some embodiments, the user interface 582 provides options for the user to select. For example, the user interface 582 may allow the user to select a meter category dimension or a meter load type dimension.

User interface 582 is configured to be the interface by which the user and a computer system interact. The term "user interface" can refer to a graphical interface or a physical interface by which a user and a computer system interact. The user interface can be a touch screen interface, a text base interface, and/or a graphical user interface (e.g., a WIMP (Windows, Icons, Menus, and Pointers) interface). In some embodiments, user interface 582 can be a physical element that displays a graphical user interface. A pointer used in this regard may be any onscreen symbol that represents movement of a physical device that the user controls. It can be used to select icons, data elements, building component 524, building component 526, etc.

An icon used in this regard may be any item on the user interface that acts as a shortcut to an action that the computer performs. In some embodiments, the user interface includes control elements that aid in usability and visibility for the user. The control elements are configured to allow a user to monitor the different energy components of energy management system 501, wherein the control elements can be component trees, drag-drop windows, buttons, scroll bars and visually-indicating icons, and various other widgets.

Building equipment 590 is configured to be one or more elements of the energy management system 501 that is outputting data to the controller in some embodiments. In some embodiments, building equipment 590 includes the sensors, and electrical devices monitoring energy usage throughout building 10. In various other embodiments, building equipment 590 can include the entity of that which is being monitored. For example, HVAC building subsystem 440 is communicably coupled to BMS controller 366 through BMS Interface 409. HVAC building subsystem 440 can include sensors and electrical devices outputting data to BMS controller 366. HVAC building subsystem 440 can also include multiple HVAC devices (e.g., heaters, chillers, air handling units, pumps, fans, thermal energy storage, etc.) that may or may not be monitored by the sensors and electrical devices. Both the HVAC devices and monitoring devices can be included in building equipment 590.

Figure 6:
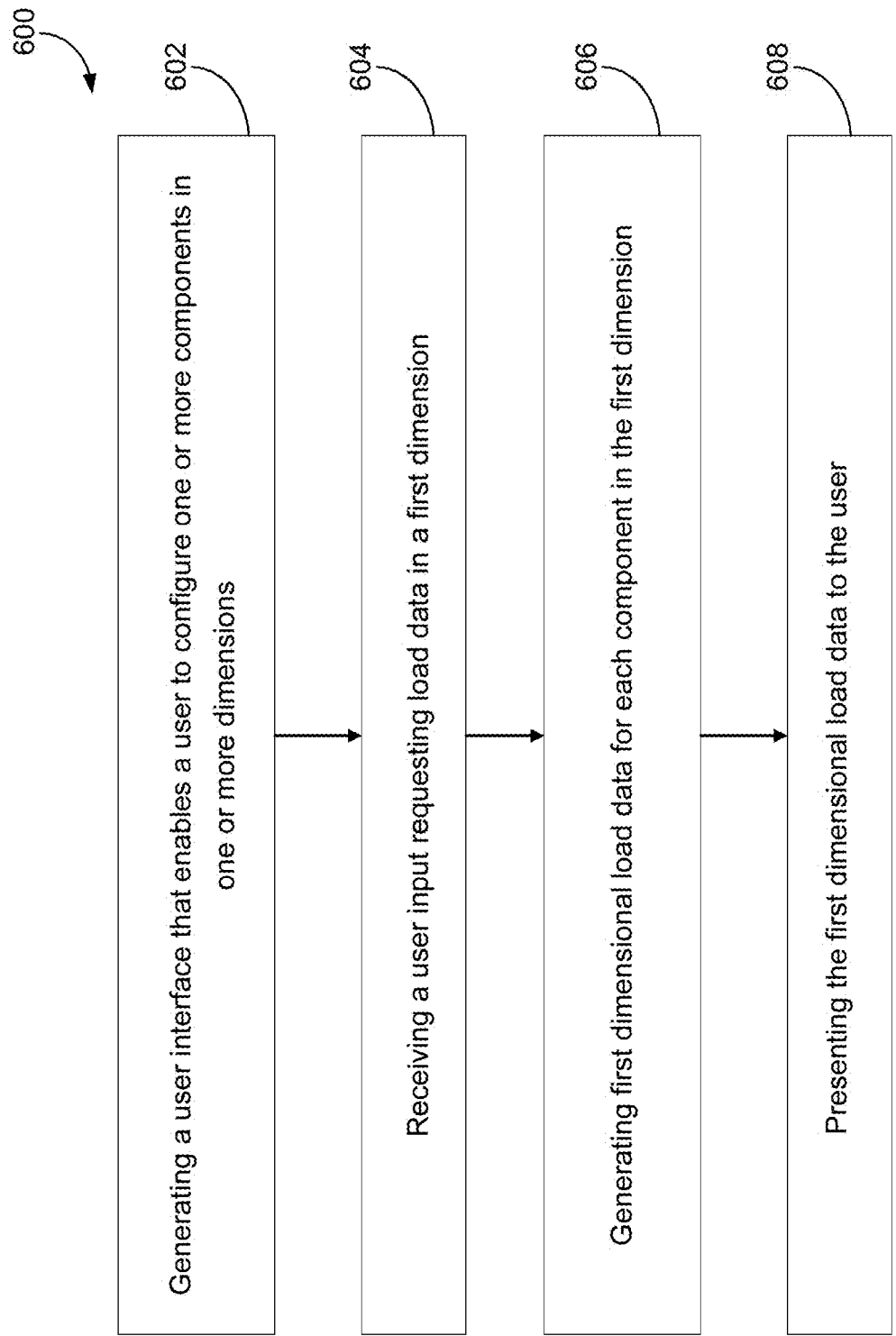
FIG. 6 is a flow diagram of a process for generating and presenting multi-dimensional load data that can be performed by the energy management system of FIG. 5, according to an exemplary embodiment.

Referring now to FIG. 6, a process 600 is shown for generating and presenting multi-dimensional load data to user. In step 602, a user interface is generated by a processing circuit similar to the processing circuit 500 of FIG. 5. The user interface is configured to receive user input and generates one or more views for displaying multi-dimensional load data.

In step 604, the processing circuit receives user input for requesting load data in a specific dimension. The user request load data can be in a single dimension (e.g., a first dimension). The user request load can be in multiple dimensions (e.g., a first dimensional data by a second dimension, a second dimensional data by a third dimension, etc.).

In step 606, a dimensional load data is generated based on the user request. The dimensional load data is generated over a user selected time period.

In step 608, the generated dimensional load data is presented to the user through the user interface.

Figure 7:
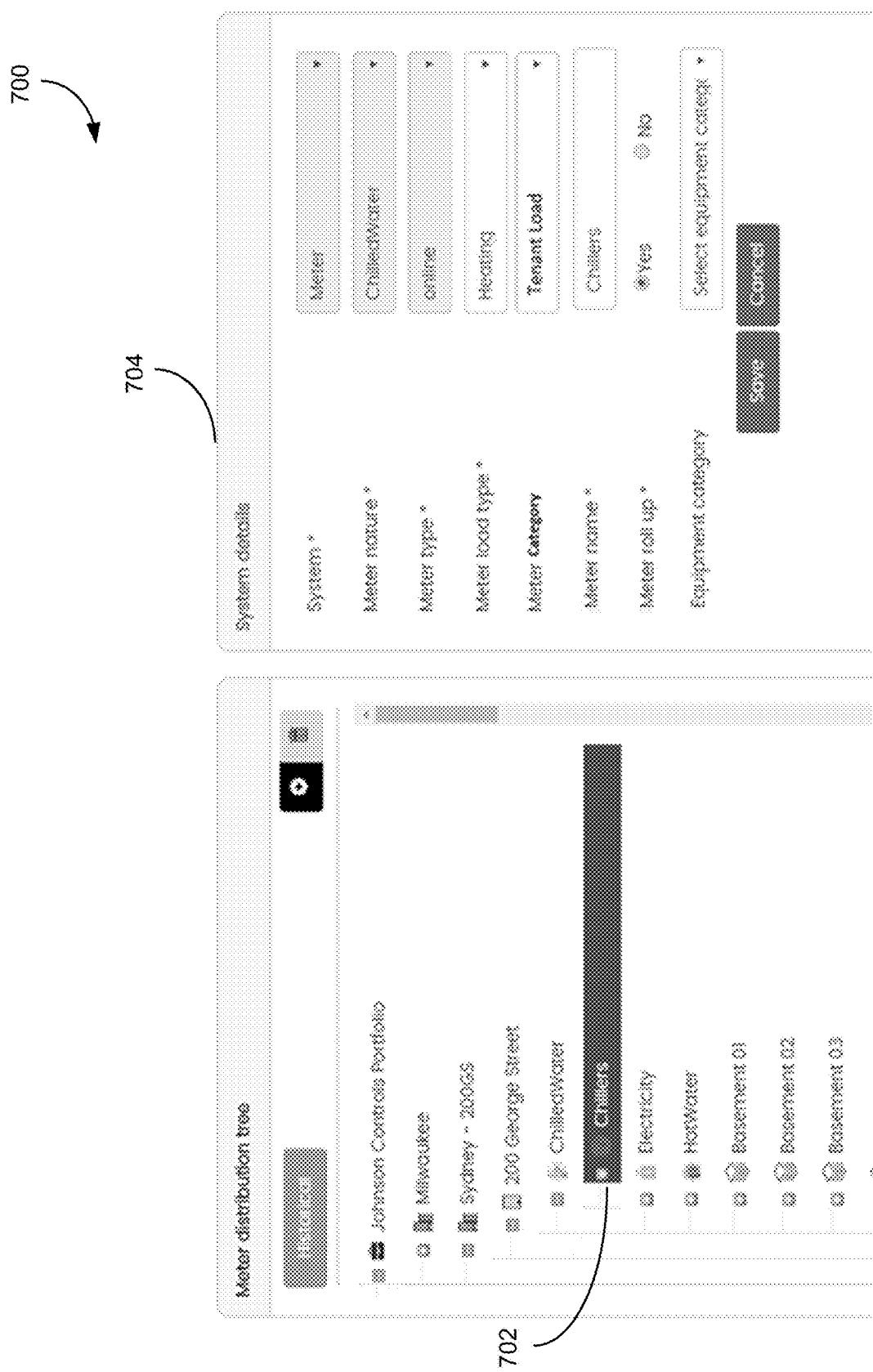
FIG. 7 is a schematic drawing of a user interface for the energy management system of FIG. 5 according to an exemplary embodiment.

Referring now to FIG. 7, a user interface 700 is shown according to an illustrative embodiment. The user interface 700 is generated by the energy management system 501. The user interface 700 is configured to provide a component distribution tree for the user to select any component for configuration. For example, the user interface 700 illustrates a meter distribution tree that shows all the historical meters in the building and the hierarchy of the meters. The user interface 700 also allows the user to configure any selected component. For example, when the user selects the component 702, the user interface 700 generates a pop-out window 704 displaying system details of the selected component 702.

The pop-out window 704 allows the user to input specific configurations for the component 702. For example, the pop-out window 704 enables the user to define a meter nature by selecting a first dimension. The first dimension may be a meter nature including, but not limited to, electricity natural gas, steam, diesel, etc. The pop-out window 704 enables the user to define a load type by selecting a second dimension. The second dimension may be a load type including, but not limited to, HVAC, lighting, plug load, IT, etc. The pop-out window 704 enables the user define a meter category by selecting a third dimension. The third dimension may indicate where the meter is used for collecting load data, which includes, but is not limited to, tenant load, vacant load, and common load. In some embodiments, each component is configured in multiple dimensions by the user, such that the load data for each component can be presented based on the dimension information. In some embodiments, the energy management system 501 checks if a component is defined under tenant load category that has a tenant attached to the component previously. Upon determining there is a tenant attached to the component previously, the energy management system 501 configures the component under the tenant load option. Upon determining there is no tenant attached to the component previously, the energy management system 501 configures the component under the vacant load option automatically.

Figure 8:
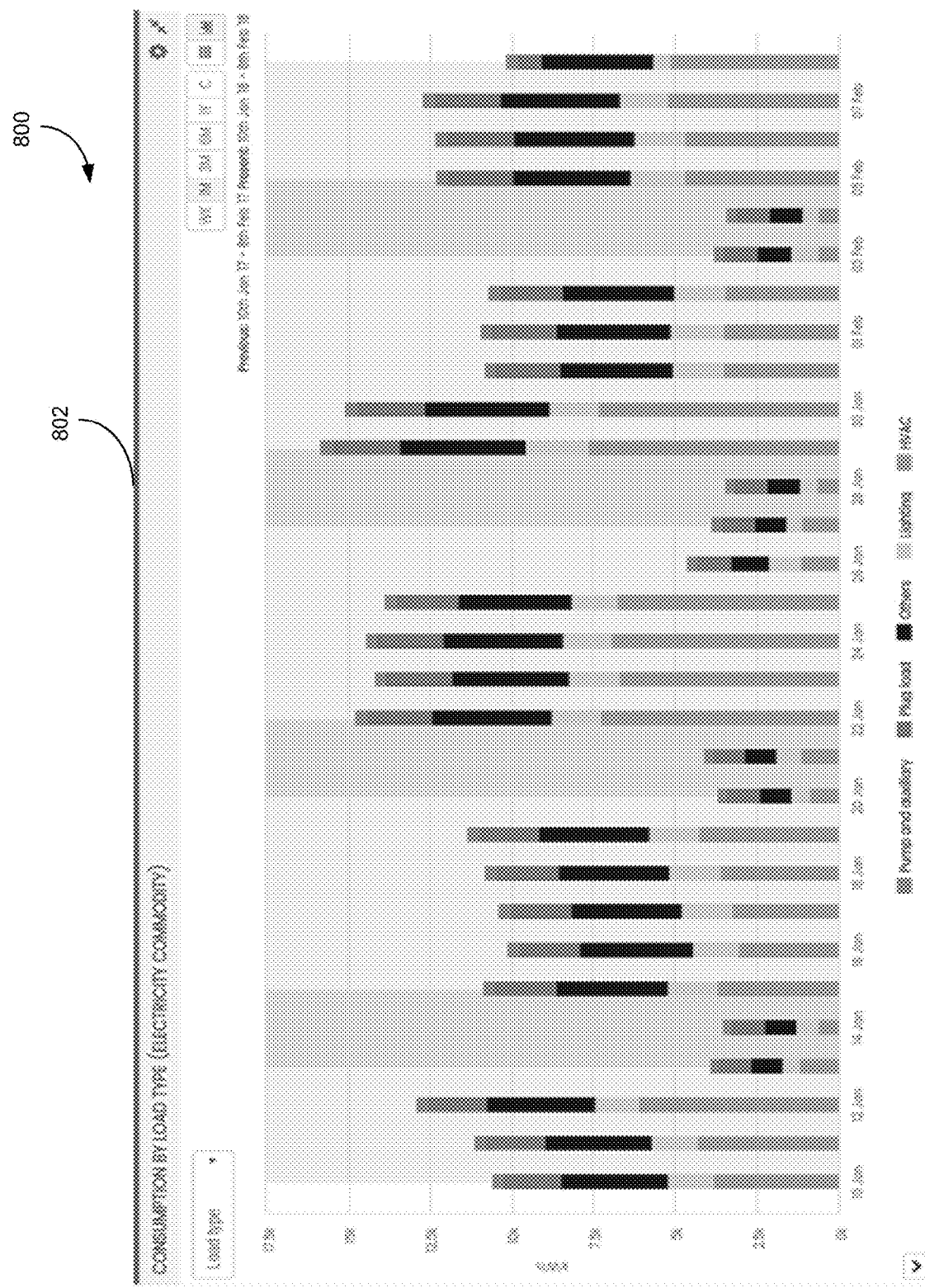
FIGS. 8-10 is schematic drawing of a user interface 800 for presenting multi-dimensional load data according some exemplary embodiments.
Figure 9:
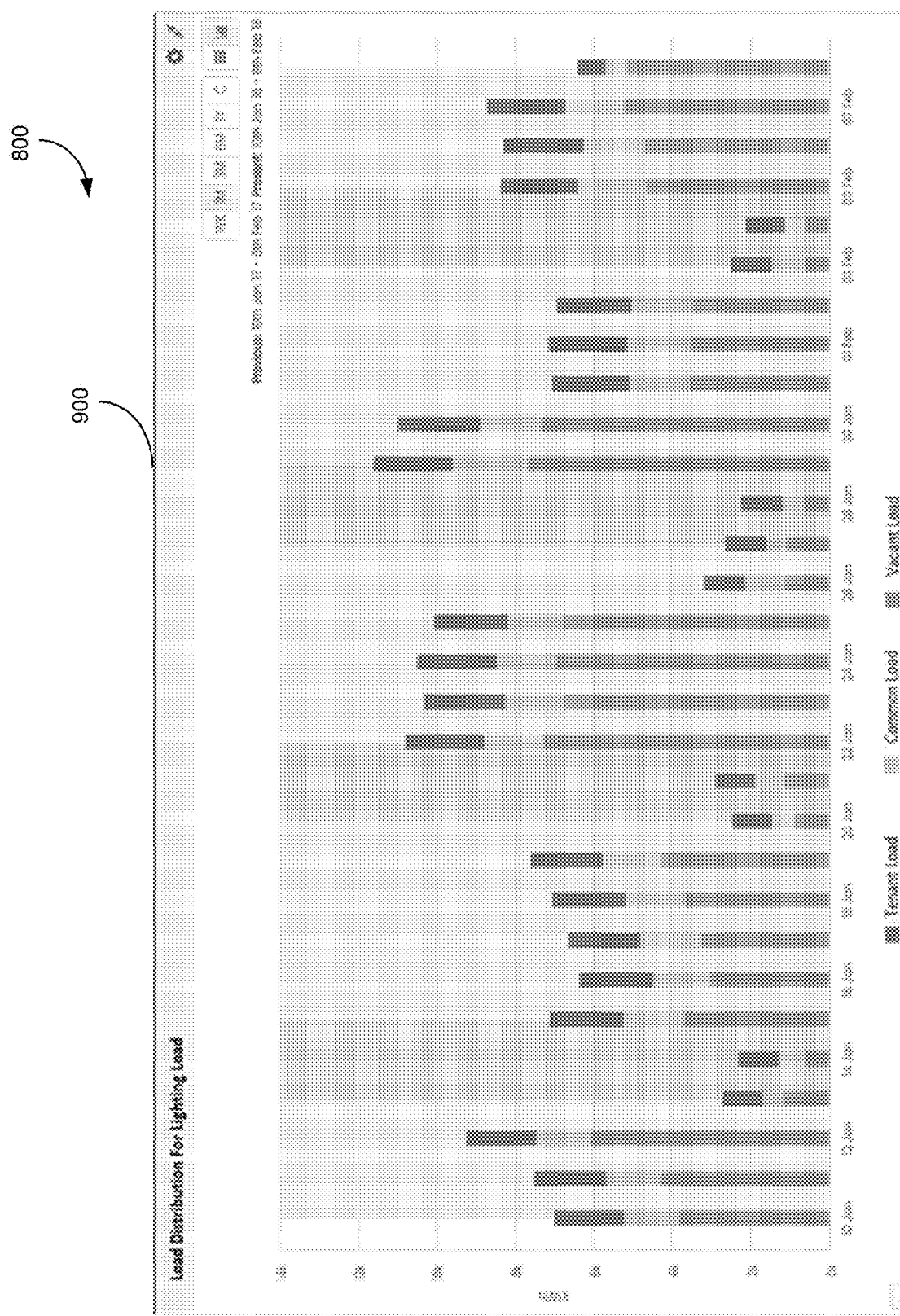
Figure 10:
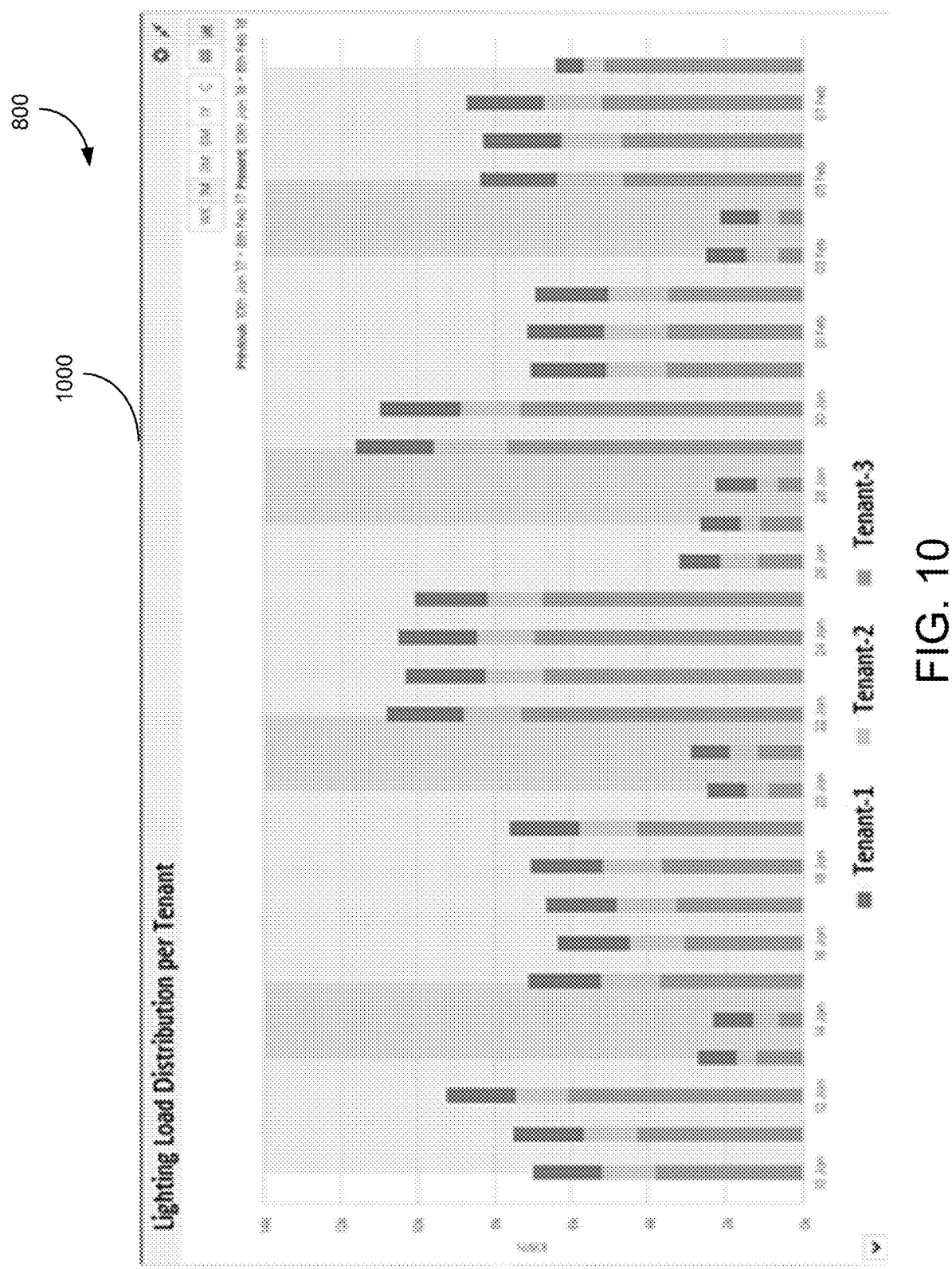

Referring now to FIGS. 8-10, a user interface 800 is shown according to some illustrative embodiments. The user interface 800 displays load data at a user selected granular level. The granular level includes the first dimension, the second dimension, and the third dimension as discussed in FIG. 7. When a user requests for load type load data, the user interface 800 displays a bar chart indicating the total load at any specific date and indicating for each date, the amount of load for each load type. For example, FIG. 8 displays consumption by load type data. When a user selects an electricity load type and requests electricity load data consumption at specific categories. The user interface 800 generates a view 802 to display the consumption by load type data indicating an amount of user selected load (e.g., electricity, natural gas, steam, etc.) for each load consumption category (e.g., pump and auxiliary, plug load, others, lighting, HVAC, etc.). The user interface 800 also allows the user to select a time period for displaying user selected multi-dimensional load data during the selected time period.

When the user clicks any of the load consumption category as displayed in FIG. 8, the user interface generates a view presenting the total load for each date broke up by the third dimension including tenant load, vacant load, common load. As shown in FIG. 9, when the user clicks lighting load consumption category, the user interface 800 generates a view 900 displaying the total lighting load that is broke up by the tenant load, the common load, and the vacant load.

The user interface 800 can present load data in further granular level. As shown in FIG. 10, the user interface 800 generates lighting load distribution per tenant view 1000. When the user selects a tenant load category, the user interface 800 generates the view 1000 displaying a lighting load further broke up by individual tenant (e.g., tenant-1, tenant-2, tenant-3).

The energy management system 501 may provide a list of suggested causes to show to the user through the user interface 800 based on linkage of a meter to equipment and equipment to fault.

In some embodiments, the energy management system 501 may provide relevant fault for the time interval it sensed the spike in consumption and generate diagnostics to present to the user through user interface 800.

Figure 11:
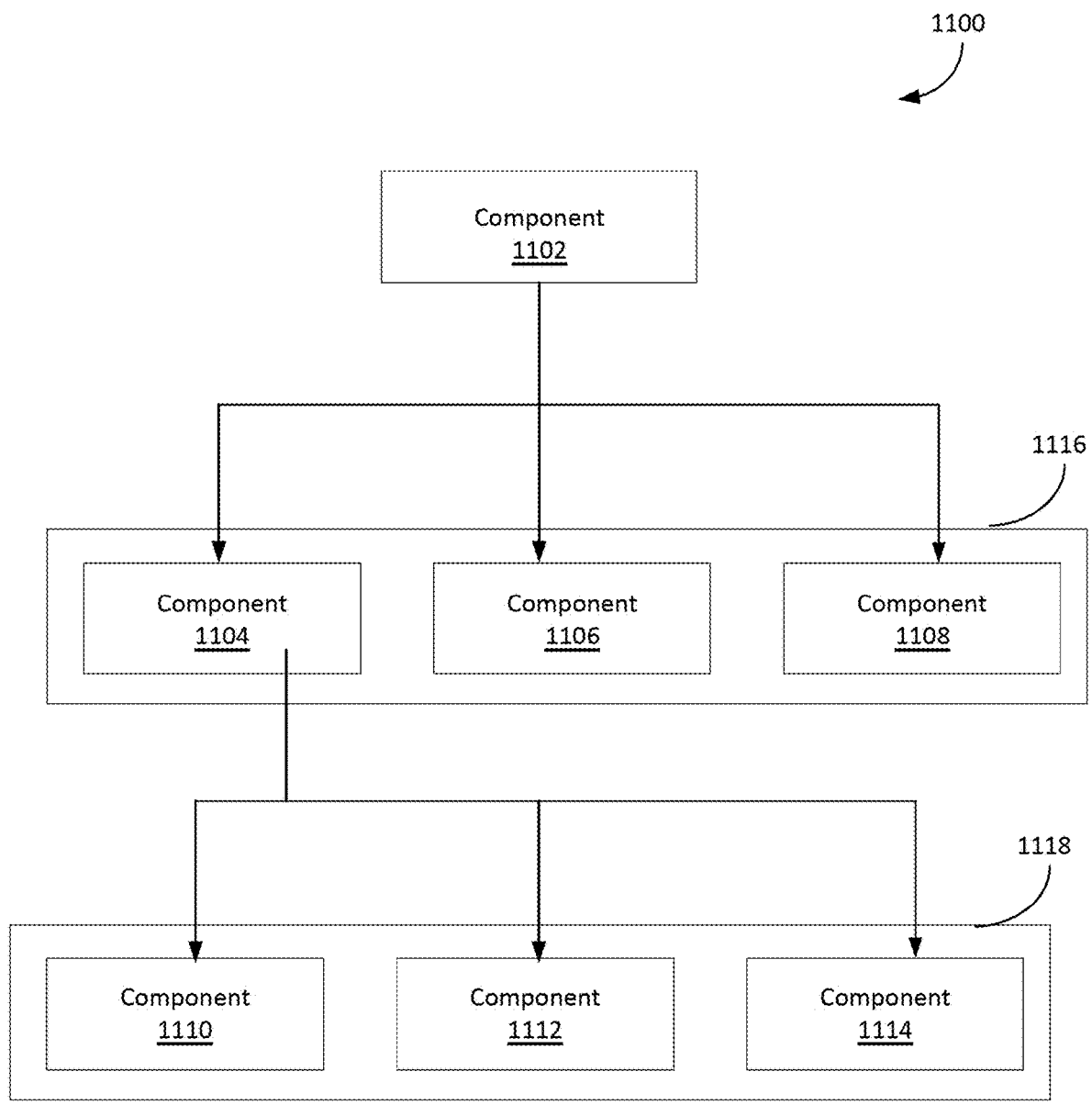
FIG. 11 is schematic drawing showing a hierarchy 1100 of building components according to an exemplary embodiment.

Referring to FIG. 11, a block diagram 1100 shows a hierarchy of a plurality of building components (e.g., building components 1102-1114). In some embodiments, the building components are controlled by the building component circuit 512. In some embodiments, the building components are configured in one or more hierarchies arranged by the component hierarchy manager 510.

The component manager 510 is configured to arrange all the components (e.g., meters) used in the building in one or more hierarchies. In some embodiments, the component manager 510 is configured to arrange the components into a hierarchy based on a location associated with each component. For example, components that are located in similar locations can be arranged in a same level within the hierarchy. In each level within the hierarchy 1100, there can be any numbers of components.

For example, component 1102 can be a main meter. The main meter 1102 is configured to monitor one or more building loads for the entire building, such as electricity, natural gas, steam, etc. the main meter 1102 is on a top level of the component hierarchy 1100.

Components 1104, 1106, and 1108 are arranged in a second level 1116 of the component hierarchy 1100. The components 1104, 1106, and 1108 can be sub meters located in one or more places within the building, such as wing, hallway, floor, etc. Each of the meters 1104, 1106, and 1108 include three dimensions. The first dimension indicates a load type (e.g., electricity, natural gas, steam, etc.) of the load data of the meter. The second dimension indicates a type of load consumption. For example, the second dimension indicates where the load is used. An electricity load can be used in HVAC, lighting, IT load, etc. The third dimension indicates a type of consumer for the load, such as tenant, vacant, common, etc.

Components 1110, 1112, and 1114 are arranged in a second level 1118 of the component hierarchy 1100. The components 1110, 1112, and 1114 can be sub meters located in one or more places within the building, such as room, zones, etc. Each of the meters 1110, 1112, and 1114 includes three dimensions. The first dimension indicates a load type (e.g., electricity, natural gas, steam, etc.) of the load data of the meter. The second dimension indicates a type of load consumption. For example, the second dimension indicates where the load is used. An electricity load can be used in HVAC, lighting, IT load, etc. The third dimension indicates a type of consumer for the load, such as tenant, vacant, common, etc.

Components of lower level communicates with one or more components at a higher level. For example, all components 1110, 1112, and 1114 at level 1118 communicate with the component 1104. All components 1104, 1106, and 1108 communicate with the component 1102.

Figure 12:
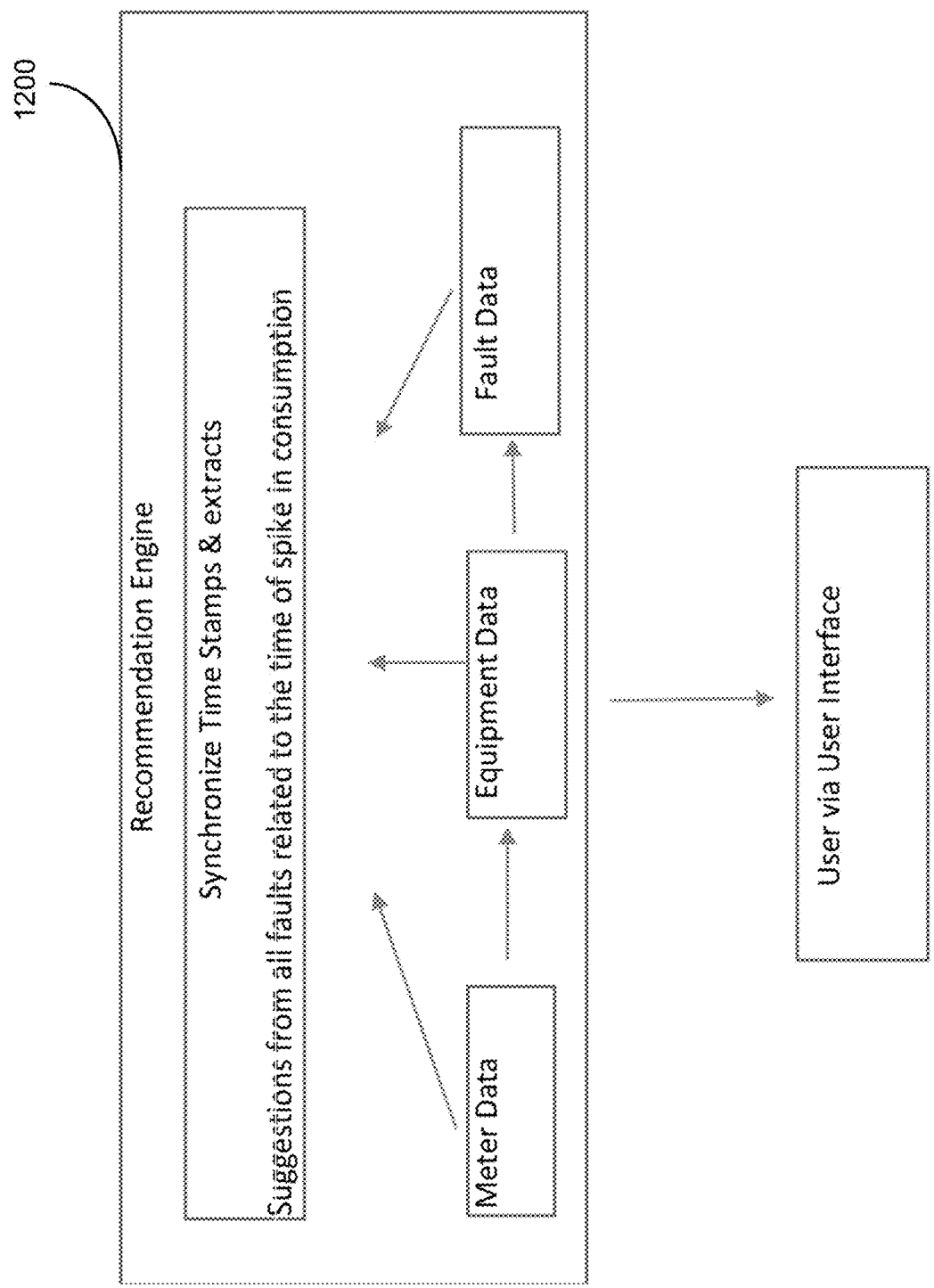
FIG. 12 is schematic drawing of a recommendation engine 1200 according to an exemplary embodiment.

Referring to FIG. 12, a block diagram of a recommendation engine 1200 for a building energy management system (e.g., energy management system 501) is shown according to an exemplary embodiment. The recommendation engine 1200 is configured to pull the relevant fault for the time interval it sensed the spike in consumption using load data from each meter in the hierarchy 1100, and provide the fault data to the user.

The recommendation engine 1200 collects load data from each component within the hierarchy 1100 and analyze the load data to generate fault data. The fault data is generated by analyzing load consumption peak during a desired time period. The recommendation engine 1200 also collects equipment data including the information of three dimensions of each component. The recommendation engine 1200 synchronizes time stamps and extracts suggestions from all faults related to the time of spike in consumption. The recommendation engine 1200 provides the faults to the user. In some embodiments, the recommendation engine sums load data based on the dimensions that the user is interested in. For example, the recommendation engine 1200 sums all electricity load data. In some embodiments, the recommendation engine 1200 sums the meter with identical load dimensions and represents to the user at each space level. In some embodiments, the recommendation engine 1200 also ensures that multiple meters belonging to same tenant aren't added. For Example, if there is a parent meter present belonging to same tenant in a particular space, and multiple child meters belonging to same tenant at spaces below it, the parent meter is only considered to be representing that tenants load.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of providing multi-dimensional load data, the method comprising:
   providing, by a processing circuit, a set of labels indicating a type of consumer, the set of labels comprising a tenant load, vacant load, and common load;
   generating, by the processing circuit, a user interface that enables one or more users to label a plurality of meters of a building with labels indicating the type of consumer from the set of labels;
   determining, by the processing circuit, a subset of the load data for a subset of the plurality of meters, the subset of the plurality of meters comprising one or more of the plurality of meters for which the labels indicate a first type of consumer; and
   performing, by the processing circuit, an automated action based on the subset of the load data.

2. The method of claim 1, further comprising:
   applying first labels to the plurality of meters, the first labels indicating a load type;
   identifying, by the processing circuit, a fault in the building responsive to determining a load consumption associated with a first load type exceeds a threshold based on first load data collected from a first subset of the plurality of meters that are labeled with the first load type;
   determining, by the processing circuit, the first type of consumer is associated with the fault based on the subset of the load data; and
   presenting, by the processing circuit, the first type of consumer to a user,
   wherein determining the subset of the load data is performed responsive to determining the load consumption associated with the first load type exceeds the threshold.

3. The method of claim 2, further comprising:
   labeling, by the processing circuit, the plurality of meters with identifications of tenants of the building that are associated with the plurality of meters;
   determining, by the processing circuit, a first subset of the load data collected from the subset of the plurality of meters that are labeled with the first type of consumer according to the identifications of the tenants; and
   identifying, by the processing circuit, a tenant as being associated with the fault based on the first subset of the load data.

4. The method of claim 1, further comprising;
   labeling, by the processing circuit, the plurality of meters with identifications of tenants of the building that are associated with the plurality of meters; and
   identifying, by the processing circuit, a parent meter associated with a tenant and one or more child meters associated with the tenant,
   wherein determining the subset of the load data comprises discarding load data generated by the one or more child meters associated with the tenant.

5. The method of claim 1, further comprising:
   labeling, by the processing circuit, a meter with a type of consumer label of vacant load responsive to determining the meter is not associated with a tenant.

6. The method of claim 1, wherein performing the automated action comprises presenting the subset of the load data to a user.

7. The method of claim 1, wherein determining the subset of the load data for the subset of the plurality of meters comprises aggregating load data obtained from a first plurality of meters of the subset of the plurality of meters.

8. A building management system for generating and presenting multi-dimensional load data, the building management system configured to:
   provide a set of labels indicating a type of consumer, the set of labels comprising a tenant load, vacant load, and common load;
   generate a user interface that enables one or more users to label a plurality of meters of a building with labels indicating the type of consumer from the set of labels;
   determine a subset of the load data for a subset of the plurality of meters, the subset of the plurality of meters comprising one or more of the plurality of meters for which the labels indicate a first type of consumer; and
   perform an automated action based on the subset of the load data.

9. The system of claim 8, wherein the building management system is further configured to:

apply first labels to the plurality of meters, the first labels indicating a load type;
identify a fault in the building responsive to determining a load consumption associated with a first load type exceeds a threshold based on first load data collected from a first subset of the plurality of meters that are labeled with the first load type;
determine the first type of consumer is associated with the fault based on the subset of the load data; and
present the first type of consumer to a user,
wherein the building management system is configured to determine the subset of the load data responsive to determining the load consumption associated with the first load type exceeds the threshold.

10. The system of claim 9, wherein the building management system is further configured to:
label the plurality of meters with identifications of tenants of the building that are associated with the plurality of meters;
determine a first subset of the load data collected from the subset of the plurality of meters that are labeled with the first type of consumer according to the identifications of the tenants; and
identify a tenant as being associated with the fault based on the first subset of load data.

11. The system of claim 8, wherein the building management system is further configured to:
label the plurality of meters with identifications of tenants of the building that are associated with the plurality of meters; and
identify a parent meter associated with a tenant and one or more child meters associated with the tenant,
wherein the building management system is configured to determine the subset of the load data by discarding load data generated by the one or more child meters associated with the tenant.

12. The system of claim 8, wherein the building management system is further configured to label a meter with a type of consumer label of vacant load responsive to determining the meter is not associated with a tenant.

13. The system of claim 8, wherein the building management system is configured to perform the automated action by presenting the subset of the load data to a user.

14. The system of claim 8, wherein the building management system is further configured to:
apply first labels to the plurality of meters, the first labels indicating a load type, wherein the load type comprises one of HVAC, lighting, plug load, or IT.

15. A building management system for managing a graphical user interface and operating one or more pieces of building equipment, the system comprising:
one or more pieces of building equipment configured to control an environmental condition of a building; and
a processing circuit configured to:
provide a set of labels indicating a type of consumer, the set of labels comprising a tenant load, vacant load, and common load;
generate a user interface that enables one or more users to label a plurality of meters of a building with labels indicating the type of consumer from the set of labels;
determine a subset of the load data for a subset of the plurality of meters, the subset of the plurality of meters comprising one or more of the plurality of meters for which the labels indicate a first type of consumer; and
perform an automated action based on the subset of the load data.

16. The system of claim 15, wherein the processing circuit is further configured to:
apply first labels to the plurality of meters, the first labels indicating a load type;
identify a fault in the building responsive to determining a load consumption associated with a first load type exceeds a threshold based on first load data collected from a first subset of the plurality of meters that are labeled with the first load type;
determine the first type of consumer is associated with the fault based on the subset of the load data; and
present the first type of consumer to a user,
wherein the building management system is configured to determine the subset of the load data responsive to determining the load consumption associated with the first load type exceeds the threshold.

17. The system of claim 16, wherein the processing circuit is further configured to:
label the plurality of meters with identifications of tenants of the building that are associated with the plurality of meters;
determine a first subset of the load data collected from the subset of the plurality of meters that are labeled with the first type of consumer according to the identifications of the tenants; and
identify a tenant as being associated with the fault based on the first subset of the load data.

18. The system of claim 15, wherein the processing circuit is further configured to:
apply first labels to the plurality of meters, the first labels indicating a load type;
wherein the load type comprises one of HVAC, lighting, plug load, or IT.

* * * * *